(12) United States Patent
Lin et al.

(10) Patent No.: US 11,946,739 B2
(45) Date of Patent: Apr. 2, 2024

(54) THICKNESS DETECTION DEVICE, METHOD AND SYSTEM

(71) Applicant: WEIHAI HUALING OPTO-ELECTRONICS CO., LTD., Shandong (CN)

(72) Inventors: Yonghui Lin, Shandong (CN); Kai Zhang, Shandong (CN); Xiaofeng Sun, Shandong (CN); Rongxin Song, Shandong (CN); Tao Qu, Shandong (CN)

(73) Assignee: WEIHAI HUALING OPTO-ELECTRONICS CO., LTD., Shandong (CN)

( * ) Notice: Subject to any disclaimer, the term of this patent is extended or adjusted under 35 U.S.C. 154(b) by 137 days.

(21) Appl. No.: 17/434,011

(22) PCT Filed: May 11, 2020

(86) PCT No.: PCT/CN2020/089676
§ 371 (c)(1),
(2) Date: Aug. 26, 2021

(87) PCT Pub. No.: WO2021/036343
PCT Pub. Date: Mar. 4, 2021

(65) Prior Publication Data
US 2022/0178675 A1 Jun. 9, 2022

(30) Foreign Application Priority Data

Aug. 29, 2019 (CN) .......................... 201910809964.3

(51) Int. Cl.
*G01B 7/06* (2006.01)
(52) U.S. Cl.
CPC ..................................... *G01B 7/08* (2013.01)

(58) Field of Classification Search
CPC ........ G01B 7/08; G01B 21/042; G01B 7/087; G01B 7/06; G07D 7/164
See application file for complete search history.

(56) References Cited

U.S. PATENT DOCUMENTS 1,984,166 A * 12/1934 Walter ................. G01N 27/223
425/141
8,068,237 B2 * 11/2011 Kurahashi .............. G01N 21/86
358/1.1
(Continued)

FOREIGN PATENT DOCUMENTS

CN  101868689 A   10/2010
CN  105469497 A    4/2016
(Continued)

OTHER PUBLICATIONS

EPO's Extended European Search Report (EESR) of corresponding application EP20859124.8; Report dated Dec. 7, 2022.

*Primary Examiner* — Akm Zakaria
(74) *Attorney, Agent, or Firm* — Samson G. Yu (57) ABSTRACT

Disclosed are a thickness detection device, method and system, a storage medium and a processor. The thickness detection device includes: a detection unit, including a plurality of thickness detection chips, wherein the thickness detection chips are sequentially arranged at least in a second direction; and a common unit, arranged opposite and spaced from the detection unit in a first direction, wherein distances between at least two positions of a first surface of the common unit and the detection unit are different, the second direction is perpendicular to the first direction and a moving direction of an object to be detected, and the first surface is a surface of the common unit which is close to the measurement unit.

17 Claims, 3 Drawing Sheets

(56) References Cited

U.S. PATENT DOCUMENTS

| | | | | |
|---|---|---|---|---|
| 8,354,912 B2* | 1/2013 | Yoneda | ............... | H01C 17/006 338/22 R |
| 2014/0155967 A1* | 6/2014 | Howard | .................. | A61N 1/05 607/116 |
| 2019/0086444 A1* | 3/2019 | Gravermann | .......... | H05K 1/189 |
| 2019/0154616 A1* | 5/2019 | Wakabayashi | ......... | G07D 7/026 |

FOREIGN PATENT DOCUMENTS

| | | |
|---|---|---|
| CN | 106289039 A | 1/2017 |
| CN | 107063068 A | 8/2017 |
| CN | 109163668 A | 1/2019 |
| CN | 110425973 A | 11/2019 |
| CN | 210512999 U | 5/2020 |
| EP | 3287992 A1 | 2/2018 |
| JP | 2017101925 A | 6/2017 |

* cited by examiner

THICKNESS DETECTION DEVICE, METHOD AND SYSTEM

CROSS-REFERENCE TO RELATED APPLICATION

The disclosure takes a patent document No. 201910809964.3, filed on Aug. 29, 2019 and entitled "Thickness Measurement Device, Method and System, Storage Medium, and Processor" as a priority document, which is incorporated herein in its entirety by reference.

TECHNICAL FIELD

The disclosure relates to the field of thickness detection, and particularly relates to a thickness detection device, method and system.

BACKGROUND

Figure 1:
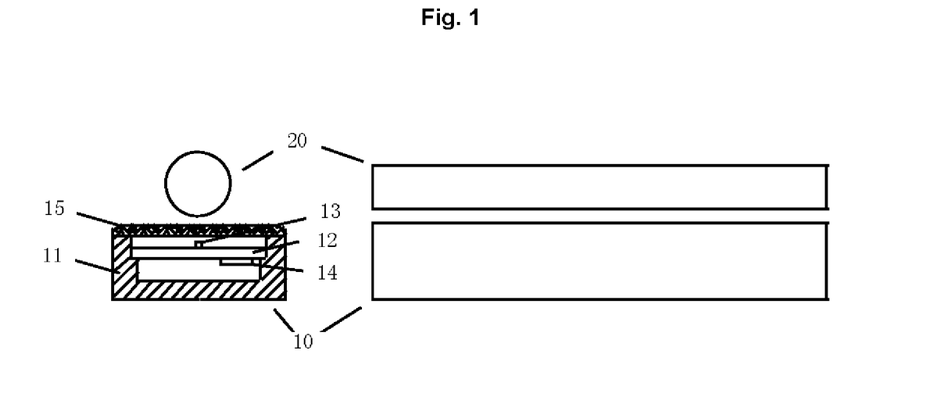
FIG. 1 shows a structural schematic diagram of a thickness detection device in the prior art.

On-line continuous thickness detection of sheet-like articles, for example, banknotes, paper, bills, plastic films to be detected, textile articles, etc., figures prominently in the production, detection, processing, recovery and other processes of their products. In recent years, a device for detecting the thickness of the film to be detected by means of electrostatic induction between parallel-plate capacitors keeps being researched and developed. As shown in FIG. 1, the detection device is generally composed of a detection unit 10 and a common unit 20, the common unit is arranged opposite and spaced from the detection unit in a first direction to form a channel of an object to be detected with a uniform gap. The detection unit consists of a frame 11, a detection substrate 12 and a cover plate 15, where a thickness detection chip 13 is arranged on the detection substrate in a second direction, and a detection control portion 14 is arranged below the detection substrate. The common unit consists of a conductive cylinder. The conductive cylinder applies an electric field to the thickness detection chip. When thickness of medium between the common unit and the thickness detection chip changes, a voltage induced by the thickness detection chip changes, so thickness of an object is detected.

SUMMARY

For achieving the objective, one aspect of the disclosure provides a thickness detection device. The thickness detection device includes: a detection unit, including a plurality of thickness detection chips, wherein the plurality of thickness detection chips are sequentially arranged at least in a second direction; and a common unit, arranged opposite and spaced from the detection unit in a first direction, wherein distances between at least two positions of a first surface of the common unit and the detection unit are different, the second direction is perpendicular to the first direction and a moving direction of an object to be detected, and the first surface is a surface of the common unit which is close to the detection unit.

Optionally, the first surface includes a first region and a second region, each position of the first region has a first distance from the detection unit, each position of the second region has a second distance from the detection unit, and the first distance is unequal to the second distance.

Optionally, there are a plurality of first regions and a plurality of second regions, and the first region and the second region are alternately arranged in the second direction, the first distance is greater than the second distance, and in any two adjacent regions which comprise the first region and the second region, a length of the first region in the second direction is less than a length of the second region in the second direction.

Optionally, the common unit includes a first conductor, a side surface of the first conductor which is close to the detection unit is provided with a plurality of grooves, and the plurality of grooves are arranged at intervals in the second direction.

Optionally, the groove is an annular groove.

Optionally, the common unit further includes a second conductor, the second conductor is arranged in the groove, an exposed surface of the first conductor which is close to the detection unit is the first region, and a surface of the second conductor which is close to the detection unit is the second region.

Optionally, a first insulation layer is arranged between the second conductor and the first conductor, and the first insulation layer insulates the first conductor from the second conductor.

Optionally, a second surface of the first conductor is provided with a plurality of protrusions, the protrusions and the grooves are arranged in a one-to-one correspondence manner in the first direction, and the second surface is a surface of the first conductor which is away from the detection unit.

Optionally, the common unit includes a third conductor and a plurality of annular sleeves, the plurality of annular sleeves sleeve the third conductor at intervals in the second direction.

Optionally, the annular sleeve is a conductive sleeve.

Optionally, a second insulation layer is arranged between the conductive sleeve and the third conductor, and the second insulation layer insulates the third conductor from the conductive sleeve.

Optionally, the annular sleeve is a non-conductive sleeve.

Optionally, the first conductor is a first cylinder, and the first cylinder has an axis parallel to the second direction.

Optionally, the third conductor is a second cylinder, and the second cylinder has an axis parallel to the second direction.

Another aspect of the disclosure provides a thickness detection method using any one of the detection devices for detection. The thickness detection method includes: applying a detection voltage to a common unit; placing an object to be detected in a gap between the common unit and a detection unit, controlling the object to be detected to move, wherein a moving direction of the object to be detected is perpendicular to a second direction, and obtaining a plurality of first voltage signals; acquiring a plurality of correction parameters, where the correction parameters are in one-to-one correspondence with the first voltage signals; correcting the corresponding first voltage signals according to the correction parameters to obtain a plurality of corrected voltage signals; and calculating a thickness of the object to be detected according to the corrected voltage signals.

Optionally, the correction parameters include a first correction parameter, and a process for acquiring the first correction parameter includes: applying the detection voltage to the common unit; and controlling the detection device to perform dummy scan to obtain a plurality of first correction parameters.

Optionally, the common unit includes a first conductor and a second conductor insulated from each other, or the common unit comprises an annular sleeve and a third conductor insulated from each other, the annular sleeve is a conductive sleeve, the second conductor and the conductive sleeve are defined as a first preset conductor, the first conductor and the third conductor are defined as a second preset conductor, the detection voltages comprise a first detection voltage and a second detection voltage, and before applying the detection voltage to the common unit, the detection method further includes: applying the first detection voltage to the first preset conductor; controlling the detection device to perform dummy scan, and outputting a plurality of third voltage signals by a plurality of thickness detection chips of the detection unit which is corresponding to the first preset conductor; placing a preset sample in the gap between the common unit and the detection unit, controlling the preset sample to move, wherein a moving direction of the preset sample is perpendicular to the second direction, detecting the preset sample, and outputting a plurality of fourth voltage signals by the plurality of thickness detection chips corresponding to the first preset conductor; acquiring a first average value and a second average value, where the first average value is an average value of the plurality of third voltage signals, and the second average value is an average value of the plurality of fourth voltage signals; applying a second preliminary voltage to the second preset conductor, wherein the second preliminary voltage is greater than the first measurement voltage; controlling the detection device to perform dummy scan, and outputting a plurality of fifth voltage signals by a plurality of thickness detection chips corresponding to the second preset conductor; placing the preset sample in the gap between the common unit and the detection unit, controlling the preset sample to move, wherein a moving direction of the preset sample is perpendicular to the second direction, and outputting a plurality of sixth voltage signals by the plurality of thickness detection chips corresponding to the second preset conductor; acquiring a third average value and a fourth average value, wherein the third average value is an average value of the plurality of fifth voltage signals, and the fourth average value is an average value of the plurality of sixth voltage signals; and adjusting the second preliminary voltage until a second difference value is equal to a first difference value, wherein under a condition that the second preliminary voltage is the second detection voltage, the first difference value is a difference value between the first average value and the second average value, and the second difference value is a difference value between the third average value and the fourth average value.

Optionally, applying the detection voltage to the common unit includes: applying the first detection voltage to the first preset conductor; and applying the second detection voltage to the second preset conductor.

Another aspect of the disclosure provides a thickness detection system. The thickness detection system includes a thickness detection device, the thickness detection device being any one of the thickness detection devices.

Optionally, the thickness detection system further includes a processing device for executing any one of the thickness detection methods.

Another aspect of the disclosure provides a storage medium. The storage medium includes a stored program, wherein when being run, the program controls an apparatus in which the storage medium is located to execute any one of the thickness detection methods.

Another aspect of the disclosure provides a processor. The processor is configured to run a program, where when being run, the program executes any one of the thickness detection methods.

BRIEF DESCRIPTION OF THE DRAWINGS

The accompanying drawings forming a part of the disclosure serve to provide a further understanding hereof, and the illustrative embodiments of the disclosure and the description of the illustrative embodiments serve to explain the disclosure and are not to be construed as unduly limiting the disclosure. In the drawings.

The above figures include the following reference numerals:

10. detection unit; 11. frame; 12. detection substrate; 13. thickness detection chip; 14. detection control portion; 15. cover plate; 20. common unit; 21. first conductor; 22. second conductor; 23. first insulation layer; 24. third conductor; 25. annular sleeve; and 26. second insulation layer.

DETAILED DESCRIPTION OF THE EMBODIMENTS

It is to be noted that the following detailed description is illustrative and is intended to provide further explanation of the disclosure. All technical and scientific terms used herein have the same meaning as commonly understood by those of ordinary skill in the art to which this application belongs unless otherwise defined.

It is noted that the term used herein is for the purpose of describing detailed embodiments only and is not intended to be limiting of the illustrative embodiments in accordance with the disclosure. As used herein, the singular is intended to include the plural unless the context clearly dictates, and furthermore, it is to be understood that the terms "include" and/or "comprise", when used in this specification, specify the presence of features, steps, operations, devices, components, and/or combinations thereof.

It should be understood that when an element (for example, a layer, film, region, or substrate) is described as being "on" another element, the element may be directly on the other element or intervening elements may also be present. Furthermore, in the specification and claims, when an element is referred to as being "connected" to another element, the element may be "directly connected" to the other element or "connected" to the other element by a third element.

As described in the background art, thickness detection devices in the prior art are prone to paper jam, and for solving the above problems, the disclosure provides a thickness detection device.

In an exemplary embodiment of the disclosure, provided is a thickness detection device. As shown in FIGS. 2-8, the thickness detection device includes:

a detection unit 10, including a plurality of thickness detection chips 13, wherein the plurality of thickness detection chips 13 are sequentially arranged at least in a second direction; and a common unit 20, arranged opposite and spaced from the detection unit 10 in a first direction, where distances between at least two positions of a first surface of the common unit 20 and the detection unit 10 are different, the second direction is perpendicular to the first direction and a moving direction of an object to be detected, and the first surface is a surface of the common unit 20 which is close to the detection unit 10.

In the thickness detection device, the distances between the at least two positions of the first surface of the common unit and the detection unit are different, resulting in different intervals between the at least two positions of the common unit and the detection unit, and thereby reducing possibility of a paper jam in the thickness detection device and improving practicability of the thickness detection device. The common unit of the thickness detection device is easily manufactured, requires low cost, and is applicable to continuous detection.

In an actual thickness detection process, a surface of an object to be detected may have larger protrusions, in order to further reduce possibility of a paper jam in the thickness detection device, in one embodiment of the disclosure, the first surface includes a first region and a second region, each position of the first region has a first distance from the detection unit, each position of the second region has a second distance from the detection unit, and the first distance is unequal to the second distance.

In order to further reduce the possibility of a paper jam in the thickness detection device, in one embodiment of the disclosure, there are a plurality of first regions and a plurality of second regions, and the first region and the second region are alternately arranged in the second direction, the first distance is greater than the second distance, and in any two adjacent regions which comprise the first region and the second region, a length of the first region in the second direction is less than a length of the second region in the second direction. Specifically, according to the above structure, the first region and the second region are alternately arranged in the second direction, such that the gaps between any two adjacent regions of the common unit and the detection unit are different, thereby further reducing the possibility of the paper jam in the thickness detection device.

It should be noted that the thickness detection chip corresponding to the first region outputs a detection signal as a first detection signal, the thickness detection chip corresponding to the second region outputs a detection signal as a second detection signal, and since the second distance is less than the first distance, the second detection signal is stronger than the first detection signal, that is, the thickness detection device provided by the disclosure has different sensitivities at different positions. Therefore, for guaranteeing an accuracy of thickness detection, the thickness detection device of the disclosure can be subjected to sensitivity correction. Of course, positions corresponding to the first regions have identical sensitivities, the positions corresponding to the second regions have identical sensitivities, so the first detection signal or the second detection signal can be discarded, and the accuracy of thickness detection can be guaranteed without sensitivity correction. However, discarding data results in incomplete thickness detection, and this approach is not suitable for full-width thickness detection.

For further improving the accuracy of thickness detection, in one embodiment of the disclosure, a length of the first region in the second direction is less than a length of the second region in the second direction. When the thickness detection device with the above structure is used for thickness detection, as a sensitivity of the position corresponding to the second region is higher, the first detection signal is discarded, and the thickness of the object to be detected is calculated by using the second detection signal, thereby further improving the accuracy of thickness detection.

Figure 2:
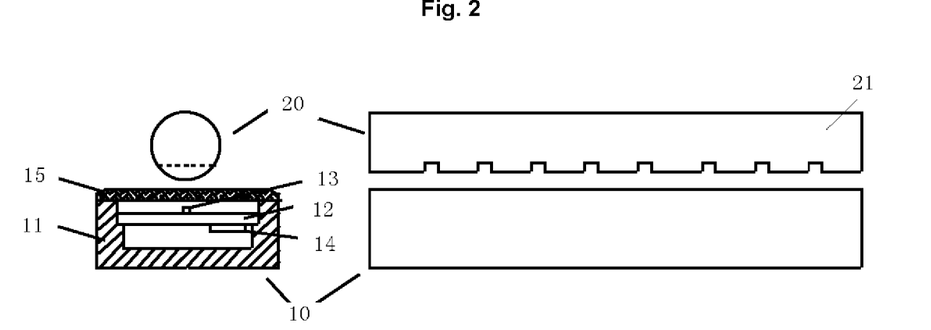
FIG. 2 shows a structural schematic diagram of a thickness detection device provided in Embodiment 1 of the disclosure.
Figure 8:
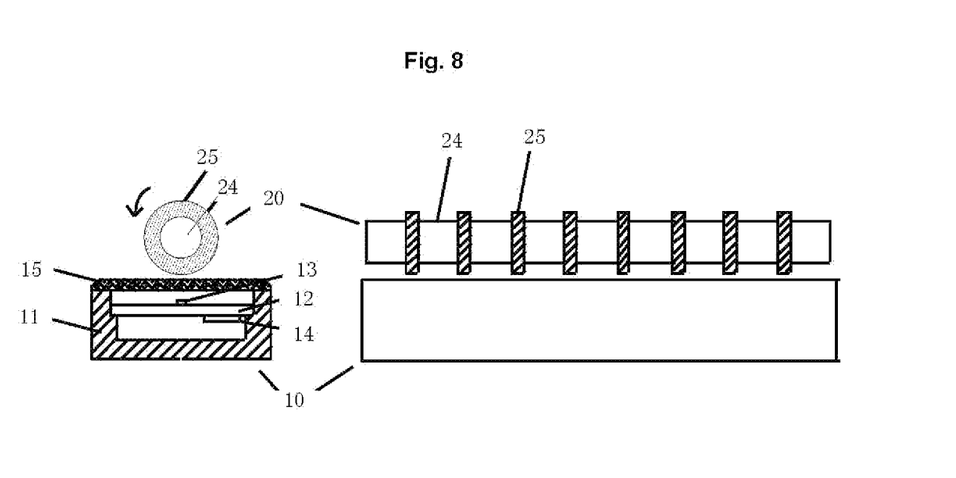
FIG. 8 shows a structural schematic diagram of a thickness detection device provided in Embodiment 7 of the disclosure.

In one specific embodiment of the disclosure, as shown in FIG. 2 and FIG. 8, the detection unit 10 includes a frame 11, a detection substrate 12 and a cover plate 15, wherein the detection substrate 12 is arranged in the frame 11 and provided with a plurality of the thickness detection chips 13 arranged in at least the second direction, the cover plate 15 is arranged parallel to the detection substrate 12 and erected on the frame 11, the cover plate 15 is configured to protect the thickness detection chips 13, the common unit 20 is arranged on a surface of the cover plate 15, and a gap between the cover plate 15 and the common unit 20 is a transmission channel of the object to be detected.

For better controlling output of the detection signal, as shown in FIG. 2 and FIG. 8, the detection unit 10 further includes a detection control portion 14 arranged on a surface of the detection substrate 12 which is away from the common unit 20, and the detection control portion 14 is at least configured to control the output of the detection signal of the thickness detection chip 13.

A structure of the common unit of the disclosure may be varied, and those skilled in the art may select a common unit of a suitable structure according to practical circumstances, while ensuring that the distances between at least two positions of the first surface of the common unit and the detection unit 10 are different.

In one specific embodiment of the disclosure, as shown in FIG. 2 to FIG. 5, the common unit 20 includes a first conductor 21, a side surface of the first conductor 21 which is close to the detection unit 10 is provided with a plurality of grooves, and the plurality of grooves are arranged at intervals in the second direction.

Figure 3:
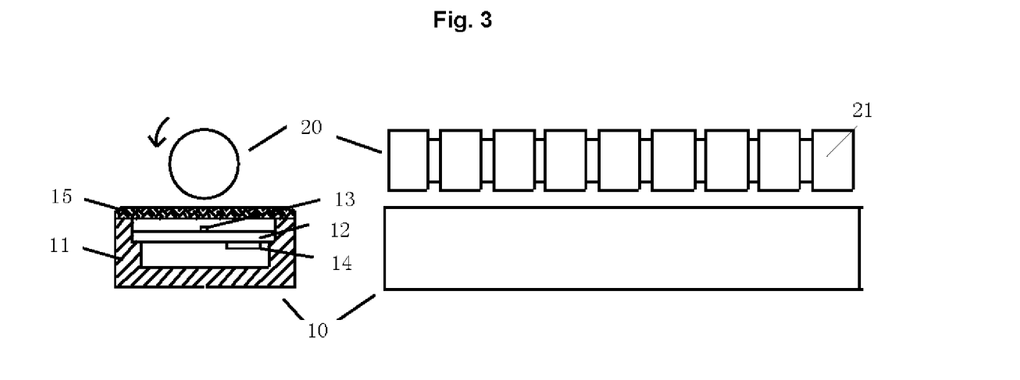
FIG. 3 shows a structural schematic diagram of a thickness detection device provided in Embodiment 2 of the disclosure.

In one specific embodiment of the disclosure, as shown in FIG. 3, the groove is an annular groove. In the above structure, the distance between each position of the annular groove which is close to an exposed surface of the detection unit and the detection unit is a first distance, and the distance between each position of remaining of the first conductor which is close to one side surface of the detection unit and the detection unit is a second distance, the first distance is greater than the second distance. Moreover, in the above structure, the first conductor with the annular groove may be manufactured by performing annular grooving on a metal rod.

Figure 4:
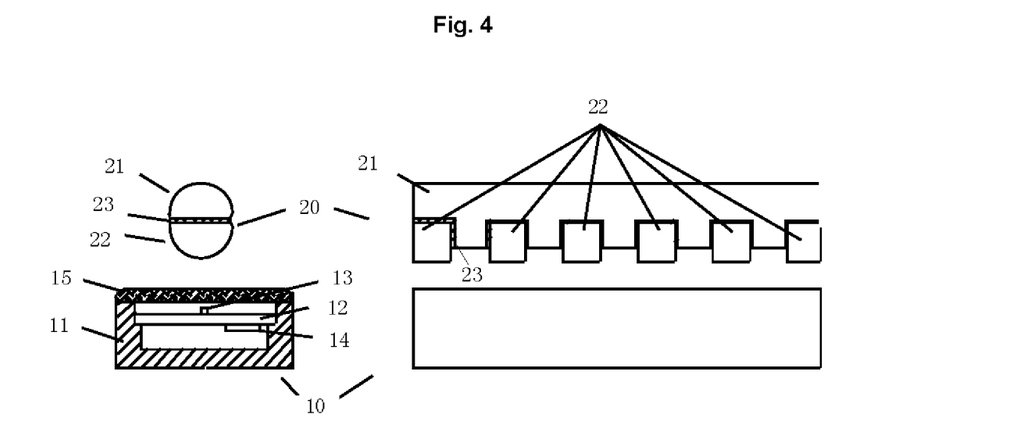
FIG. 4 shows a structural schematic diagram of a thickness detection device provided in Embodiment 3 of the disclosure.

In one specific embodiment of the disclosure, as shown in FIG. 4, the common unit 20 further includes a second conductor 22, the second conductor 22 is arranged in the groove, an exposed surface of the first conductor 21 which is close to the detection unit 10 is the first region, and a surface of the second conductor 22 which is close to the detection unit 10 is the second region. In the above structure, the distance between each position of the first conductor which is close to one side surface of the detection unit and the detection unit is a first distance, and the distance between each position of the second conductor which is close to the exposed surface of the detection unit and the detection unit is a second distance, the first distance is greater than the second distance.

In one specific embodiment of the disclosure, as shown in FIG. 4, a first insulation layer 23 is arranged between the second conductor 22 and the first conductor 21, and the first insulation layer 23 insulates the first conductor 21 from the second conductor 22. In the above structure, the distance between each position of the first conductor which is close to one side surface of the detection unit and the detection unit is a first distance, and the distance between each position of the second conductor which is close to the exposed surface of the detection unit and the detection unit is a second distance, the first distance is greater than the second distance. In this embodiment, the first conductor and the second conductor are insulated, and different voltages are applied to the first conductor and the second conductor in a detection process, so as to obtain a more accurate detection result.

Figure 5:
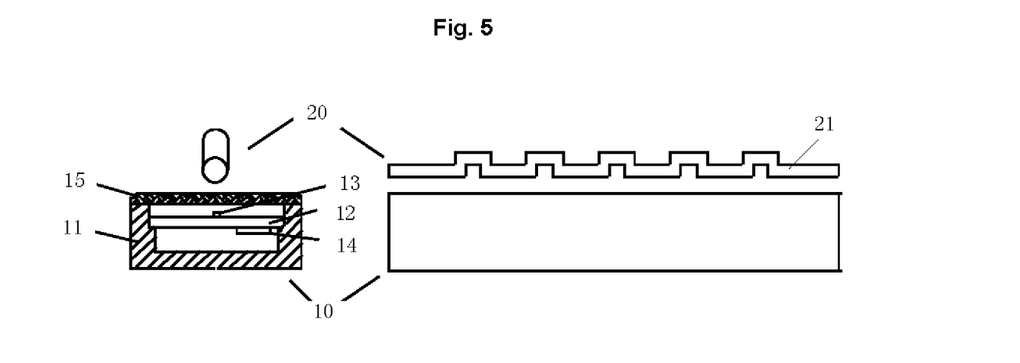
FIG. 5 shows a structural schematic diagram of a thickness detection device provided in Embodiment 4 of the disclosure.

In one specific embodiment of the disclosure, as shown in FIG. 5, a second surface of the first conductor 21 is provided with a plurality of protrusions, the protrusions and the grooves are arranged in a one-to-one correspondence manner in the first direction, and the second surface is a surface of the first conductor 21 which is away from the detection unit 10. Moreover, in the above structure, the first conductor with the protrusion can be manufactured by bending a metal rod.

It should be noted that those skilled in the art may also rotate the first conductor having the protrusion to make the second surface become a surface of the first conductor which is close to the detection unit. In this structure, the distance between each position of the protrusion which is close to the exposed surface of the detection unit and the detection unit is a second distance, and the distance between each position of remaining of the first conductor which is close to one side surface of the detection unit and the detection unit is a first distance, the first distance is larger than the second distance.

Figure 6:
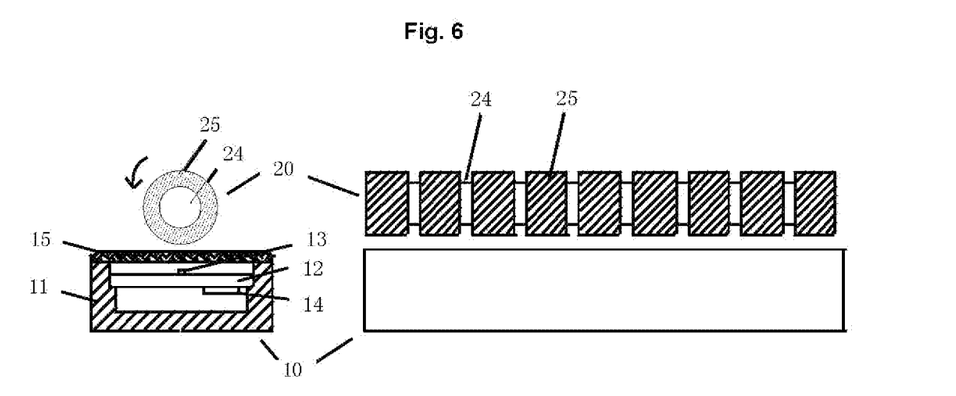
FIG. 6 shows a structural schematic diagram of a thickness detection device provided in Embodiment 5 of the disclosure.
Figure 7:
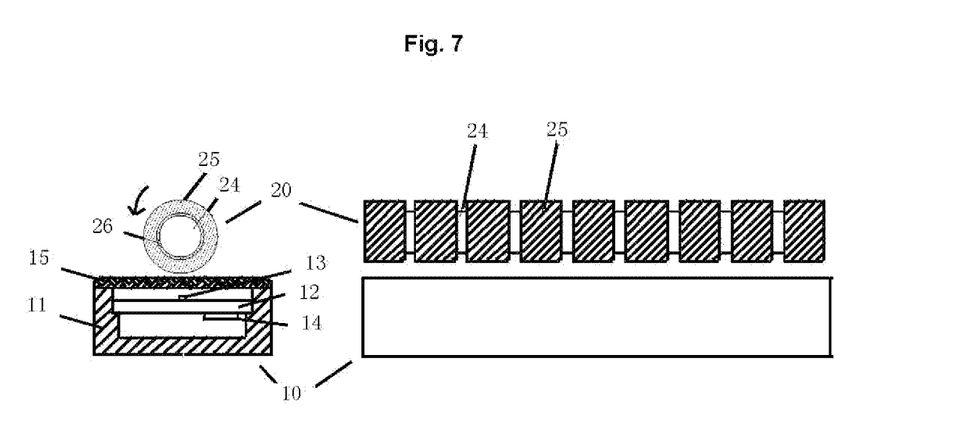
FIG. 7 shows a structural schematic diagram of a thickness detection device provided in Embodiment 6 of the disclosure.

In one specific embodiment of the disclosure, as shown in FIG. 6 to FIG. 8, the common unit 20 includes a third conductor 24 and a plurality of annular sleeves 25, the plurality of annular sleeves 25 sleeve the third conductor 24 at intervals in the second direction. In the above structure, the distance between each position of the third conductor which is close to one exposed side surface of the detection unit and the detection unit is a first distance, and the distance between each position of the annular sleeve which is close to a surface of the detection unit and the detection unit is a second distance, the first distance is greater than the second distance.

In one specific embodiment of the disclosure, as shown in FIG. 6, the annular sleeve 25 is a conductive sleeve. In the above structure, when the object to be measured is jammed, the common unit rotates, such that the conductive sleeve is separated from the object to be measured, and the object to be detected can pass through the detection channel more easily, thereby further reducing the possibility of the paper jam. Specifically, the conductive sleeve may be a conductive rubber stick, and a friction coefficient of the conductive rubber stick is higher, such that the object to be measured may pass through the detection channel more easily. Certainly, those skilled in the art may select a proper conductive sleeve according to actual conditions.

Since different positions of the thickness detection device have different sensitivities, for correcting the sensitivities of the thickness detection device by adjusting the detection voltage, in one specific embodiment of the disclosure, as shown in FIG. 7, a second insulation layer 26 is arranged between the conductive sleeve and the third conductor 24, and the first insulation layer 26 insulates the third conductor 24 from the conductive sleeve. In this embodiment, the conductive sleeve and the third conductor are insulated, and different voltages are applied to the conductive sleeve and the third conductor in a detection process, so as to obtain a more accurate detection result.

In one specific embodiment of the disclosure, as shown in FIG. 8, the annular sleeve 25 is a non-conductive sleeve. In the above structure, when the object to be detected is jammed, the common unit can rotate, such that the conductive sleeve is separated from the object to be detected, and the object to be detected can pass through the detection channel more easily, thereby further reducing the possibility of a banknote jam, specifically, the conductive sleeve may be a non-conductive rubber stick, and certainly, those skilled in the art may select a proper conductive sleeve according to actual conditions.

In one specific embodiment of the disclosure, as shown in FIG. 2 to FIG. 5, the first conductor 21 is a first cylinder, and the first cylinder has an axis parallel to the second direction.

In one specific embodiment of the disclosure, as shown in FIG. 6 to FIG. 8, the third conductor 24 is a second cylinder, and the second cylinder has an axis parallel to the second direction.

Certainly, the above first conductor and third conductor are not limited to cylinders only, and those skilled in the art may select the first conductor and the third conductor with proper shapes, for example, prisms, according to the actual conditions.

In another exemplary embodiment of the disclosure, provided is a thickness detection method. The detection method uses any one of the detection devices for detection.

Specifically, the detection method includes: apply a detection voltage to a common unit; place an object to be detected in a gap between the common unit and a detection unit, controlling the object to be detected to move, wherein a moving direction of the object to be detected is perpendicular to a second direction, and obtaining a plurality of first voltage signals Cn; acquire a plurality of correction parameters, where the correction parameters are in one-to-one correspondence with the first voltage signals Cn; correct the corresponding first voltage signals Cn according to the correction parameters to obtain a plurality of corrected voltage signals Jn; and calculate a thickness of the object to be detected according to the corrected voltage signals Jn.

In the thickness detection method, firstly, the object to be detected is detected to obtain the plurality of first voltage signals, then the plurality of correction parameters are acquired, the corresponding first voltage signals are corrected according to the correction parameters to obtain the plurality of corrected voltage signals, and finally the thickness of the object to be detected is calculated according to the corrected voltage signals. On the premise that the possibility of the paper jam is small, the thickness detection method corrects the sensitivity of the thickness detection device, thereby improving the accuracy of thickness detection.

In an actual detection process, since different positions of the thickness detection device have different sensitivities, the detected thickness is inaccurate, the thickness detection method can correct the sensitivity of the thickness detection device by adjusting the detection voltage, and under this condition, the first voltage signal is corrected only by means of dummy scan of the voltage signal, so as to improve the detection accuracy. In one embodiment of the disclosure, the correction parameters includes a first correction parameter An, and a process for acquiring the first correction parameter An includes: apply the detection voltage to the common unit; and control the detection device to perform dummy scan to obtain a plurality of first correction parameters An. Specifically, the detection voltage is applied to the common unit, the detection voltage is identical to the detection voltage applied to the object to be detected for detection, then the detection device is controlled to perform dummy scan to obtain the plurality of the first correction parameters, and the correction parameters are in one-to-one correspondence with the first voltage signals.

Certainly, it is also possible to correct the sensitivity of the thickness detection device without adjusting the detection voltage, under this condition, for reducing the influence caused by the different sensitivities and further improving the accuracy of the thickness detection, in one embodiment of the disclosure, the correction parameters further includes a second correction parameter Kn, and a process for acquiring the second correction parameter Kn includes: apply the detection voltage to the common unit; place a preset sample in the gap between the common unit and the detection unit, control the preset sample to move, wherein a movement direction of the preset sample is perpendicular to the second direction, and obtain a plurality of second voltage signals Bn; and calculate the second correction parameter Kn according to a correction target value M, the first correction parameter An and the corresponding second voltage signals Bn. The step of correcting the corresponding first voltage signals according to the correction parameters to obtain a plurality of corrected voltage signals includes: correct the corresponding first voltage signals Cn according to the first correction parameter An and the second correction parameter Kn to obtain the plurality of corrected voltage signals Jn.

Specifically, a value range of the correction target value M is 201-255. In one detection process, the correction target value is a fixed value, and those skilled in the art may select a proper correction target value according to actual conditions. A formula of the second correction parameter Kn is Kn=M/(Bn−An), n is a positive integer, and when the corresponding first voltage signal Cn is corrected according to the first correction parameter An and the second correction parameter Kn, the formula of the corrected voltage signal Jn is Jn=(Cn−An)×Kn.

According to the thickness detection method in the disclosure, the corresponding first voltage signal can be corrected only according to the first correction parameter, and under this condition, the sensitivity of the thickness detection device can be corrected by adjusting the detection voltage. In one specific embodiment of the disclosure, the common unit includes a first conductor and a second conductor insulated from each other, or the common unit includes an annular sleeve and a third conductor insulated from each other, the annular sleeve is a conductive sleeve, the second electric conductor and the conductive sleeve are defined as a first preset conductor, the first conductor and the third conductor are defined as a second preset conductor, and the detection voltages include a first detection voltage and a second detection voltage. Before applying the detection voltage to the common unit, the detection method further includes: apply the first detection voltage to the first preset conductor; control the detection device to perform dummy scan, and output a plurality of third voltage signals by a plurality of thickness detection chips of the detection unit which is corresponding to the first preset conductor; place a preset sample in the gap between the common unit and the detection unit, controlling the preset sample to move, wherein a moving direction of the preset sample is perpendicular to the second direction, detecting the preset sample, and output a plurality of fourth voltage signals by the plurality of thickness detection chips corresponding to the first preset conductor; acquire a first average value AL and a second average value BL, wherein the first average value AL is an average value of the plurality of third voltage signals, and the second average value BL is an average value of the plurality of fourth voltage signals; apply a second preliminary voltage to the second preset conductor, wherein the second preliminary voltage is greater than the first detection voltage; control the detection device to perform dummy scan, and output a plurality of fifth voltage signals by a plurality of thickness detection chips corresponding to the second preset conductor; place the preset sample in the gap between the common unit and the detection unit, control the preset sample to move, wherein a moving direction of the preset sample is perpendicular to the second direction, and output a plurality of sixth voltage signals by the plurality of thickness detection chips corresponding to the second preset conductor; acquire a third average value AX and a fourth average value BX, wherein the third average value AX is an average value of the plurality of fifth voltage signals, and the fourth average value BX is an average value of the plurality of sixth voltage signals; and adjust the second preliminary voltage until a second difference value is equal to a first difference value, that is, BL-AL=BX-AX, wherein under a condition that the second preliminary voltage is the second detection voltage, the first difference value is a difference value between the first average value and the second average value, and the second difference value is a difference value between the third average value and the fourth average value. The method for correcting the sensitivity of the thickness detection device by adjusting the detection voltage can eliminate a sensitivity difference at different positions of the detection unit, and accordingly, the detected voltage signal can truly reflect an actual thickness of the detected object.

Specifically, in a process of adjusting the second preliminary voltage, the first detection voltage is always lower than the second detection voltage, and those skilled in the art may select the proper first detection voltage according to actual conditions.

For reducing the influence caused by different sensitivities at different positions of the thickness detection device, in one specific embodiment of the disclosure, the step of applying a detection voltage to a common unit includes: apply the first detection voltage to the first preset conductor; and apply the second detection voltage to the second preset conductor. Specifically, the corresponding first voltage signal Cn is corrected according to the first correction parameter An, wherein a formula of a corrected voltage signal Jn is Jn=(Cn−An).

In another exemplary embodiment of the disclosure, provided is a thickness detection system, including a thickness detection device, the thickness detection device is any one of the thickness detection devices.

In the thickness detection system, the distances between the at least two positions of the first surface of the common unit and the detection unit are different, resulting in different intervals between the at least two positions of the common unit and the detection unit, and thereby reducing possibility of a paper jam in the thickness detection device and improving practicability of the thickness detection device, and the thickness detection system is particularly suitable for occasions of continuous detection and can correct the sensitivity of the thickness detection device, so as to improve the accuracy of thickness detection.

The thickness detection system further includes a processing device for executing any one of the detection methods.

In another embodiment of the disclosure, under a condition of detecting an object to be detected, a signal output by a detection unit of the thickness detection device is a first voltage signal, and the processing device includes a controlling unit, an acquiring unit, a correcting unit and a calculating unit, wherein the controlling unit is configured to control detection voltage applying to the common unit of the thickness detection device, and is also configured to control the object to be detected to move; the acquiring unit is configured to acquire a plurality of correction parameters, and the correction parameters are in one-to-one correspondence with the first voltage signals; the correcting unit is configured to correct the corresponding first voltage signals according to the correction parameters to obtain a plurality of corrected voltage signals; and the calculation unit is configured to calculate a thickness of the object to be detected according to the corrected voltage signals.

In order to enable those skilled in the art to more clearly understand the technical solution of the disclosure, the technical solution of the disclosure will be described below with reference to specific embodiments.

Embodiment 1

As shown in FIG. 2, the thickness detection device includes a detection unit 10 and a common unit 20, the common unit 20 is arranged opposite and spaced from the detection unit 10 in a first direction.

The detection unit 10 includes a frame 11, a detection substrate 12, thickness detection chips 13, a detection control portion 14, and a cover plate 15, wherein the detection substrate 12 is arranged in the frame 11, the cover plate 15 is arranged parallel to the detection substrate 12 and connected to the frame 11, the thickness detection chips 13 are sequentially arranged on a surface of the detection substrate 12 which is close to the common unit 20 at least in the second direction, and the detection control portion 14 is arranged on another surface of the detection substrate 12. Six thickness detection chips 13 have a resolution ratio of 50 DPL and two hundred and sixteen detection points in total, an effective scanning length is 108 mm, and the cover plate 15 is 0.4 mm Indium-Tin Oxide (ITO) glass.

The common unit 20 includes a first conductor 21, a side surface of the first conductor 21 which is close to the detection unit 10 is provided with a plurality of grooves, and the plurality of grooves are arranged at intervals in the second direction, and the second direction is perpendicular to the first direction and a moving direction of the object to be detected. A distance between each position of the groove which is close to an exposed surface of the detection unit 10 and the detection unit 10 is a first distance, a distance between each position of remaining of the first conductor 21 which is close to one side surface of the detection unit 10 and the detection unit 10 is a second distance, the first distance is 3.5 mm, the second distance is 0.5 mm, the first conductor 21 is a metal round bar with a diameter of 10 mm, the groove has a depth of 4 mm and a length of 15 mm in the second direction, and a distance between any two adjacent grooves is 20 mm.

The specific detection method includes:

apply a detection voltage to the common unit; place an object to be detected in a gap between the common unit and the detection unit, control the object to be detected to move, where a moving direction of the object to be detected is perpendicular to the second direction, and obtain a plurality of first voltage signals Cn; apply the detection voltage to the common unit; control the detection device to perform dummy scan to obtain a plurality of first correction parameters An, where the first correction parameters are in one-to-one correspondence with the first voltage signals Cn, and apply the detection voltage to the common unit; place a preset sample in the gap between the common unit and the detection unit, control the preset sample to move, where a movement direction of the preset sample is perpendicular to the second direction, and obtain a plurality of second voltage signals Bn; calculate the second correction parameters Kn according to a correction target value M, the first correction parameters An and the corresponding second voltage signals Bn, where the second correction parameters are in one-to-one correspondence with the first voltage signals Cn; correct the corresponding first voltage signals Cn according to the first correction parameters An and the second correction parameters Kn to obtain a plurality of corrected voltage signals Jn; and calculate a thickness of the object to be detected according to the corrected voltage signal Jn.

Embodiment 2

Different from Embodiment 1, as shown in FIG. 3, the groove is an annular groove, the first conductor 21 is a metal round bar with a diameter of 16 mm, the annular groove has a depth of 3 mm and a length of 3 mm in the second direction, and a distance between any two adjacent grooves is 10 mm.

Embodiment 3

Different from Embodiment 1,
as shown in FIG. 4, the common unit 20 further includes a second conductor 22 and a first insulation layer 23, wherein the second conductor 22 is arranged in the groove, the first insulation layer 23 is arranged between the second conductor 22 and the first conductor 21, an exposed surface of the first conductor 21 which is close to the detection unit 10 is the first region, a surface of the second conductor 22 which is close to the detection unit 10 is the second region, a distance between each position of the first conductor 21 which is close to one side surface of the detection unit 10 and the detection unit 10 is a first distance, a distance between each position of the second conductor 22 which is close to the exposed surface of the detection unit 10 and the detection unit 10 is a second distance, the first distance is 2.3 mm, the second distance is 0.3 mm, the second conductor 22 is formed by cutting a metal round bar with a length of 15 mm and a diameter of 10 mm in an axis direction by 4 mm, and a distance between a tangent plane and the axis is 1 mm.

The specific detection method includes:
apply the first detection voltage to the second conductor; control the detection device to perform dummy scan, and output a plurality of third voltage signals by a plurality of thickness detection chips of the detection unit which is corresponding to the second conductor;

place a preset sample in the gap between the common unit and the detection unit, control the preset sample to move, where a moving direction of the preset sample is perpendicular to the second direction, measure the preset sample, and output a plurality of fourth voltage signals by the plurality of thickness detection chips corresponding to the first preset conductor; acquire a first average value AL and a second average value BL, wherein the first average value AL is an average value of the plurality of third voltage signals, and the second average value BL is an average value of the plurality of fourth voltage signals; apply a second preliminary voltage to the first conductor, wherein the second preparatory voltage is greater than the first detection voltage; control the detection device to perform dummy scan, and output a plurality of fifth voltage signals by a plurality of thickness detection chips corresponding to the first conductor; place the preset sample in the gap between the common unit and the detection unit, control the preset sample to move, wherein the moving direction of the preset sample is perpendicular to the second direction, and output a plurality of sixth voltage signals by the plurality of thickness detection chips corresponding to the second preset conductor; acquire a third average value AX and a fourth average value BX, where the third average value AX is an average value of the plurality of fifth voltage signals, and the fourth average value BX is an average value of the plurality of sixth voltage signals; and adjust the second preliminary voltage until a second difference value is equal to a first difference value, that is, BL−AL=BX−AX, where under the condition that the second preliminary voltage is the second detection voltage, the first difference value is a difference value between the first average value and the second average value, and the second difference value is a difference value between the third average value and the fourth average value.

Embodiment 4

Different from Embodiment 1, as shown in FIG. 5, a second surface of the first conductor 21 is provided with a plurality of protrusions, the protrusions and the grooves are arranged in a one-to-one correspondence manner in the first direction, the second surface is a surface of the first conductor 21 which is away from the detection unit 10, the first conductor 21 is a metal round bar with a diameter of 10 mm, the groove has a depth of 4 mm and a length of 15 mm in the second direction, and a distance between any two adjacent grooves is 20 mm.

Embodiment 5

Different from Embodiment 1, as shown in FIG. 6, the common unit 20 includes a third conductor 24 and a plurality of annular sleeves 25, the plurality of annular sleeves 25 sleeve the third conductor 24 at intervals in the second direction, and the annular sleeves 25 are conductive sleeves. A distance between each position of the third conductor 24 which is close to one exposed side surface of the detection unit 10 and the detection unit 10 is a first distance, a distance between each position of the annular sleeve 25 which is close to a surface of the detection unit 10 and the detection unit 10 is a second distance, the first distance is 2.5 mm, the second distance is 0.5 mm, the third conductor 24 is a metal round bar with a diameter of 10 mm, and the annular sleeve 25 is an annular conductive rubber stick with an inner diameter of 10 mm, an outer diameter of 12 mm and a length of 10 mm.

Embodiment 6

Different from Embodiment 5, as shown in FIG. 7, a second insulation layer 26 is arranged between the annular sleeve 25 and the third conductor 24, and the second insulation layer 26 insulates the third conductor 24 from the annular sleeve 25.

The specific detection method includes:
apply the first detection voltage to the conductive sleeve; control the detection device to perform dummy scan, and output a plurality of third voltage signals by a plurality of thickness detection chips of the detection unit which is corresponding to the conductive sleeve; place a preset sample in the gap between the common unit and the detection unit, control the preset sample to move, where a moving direction of the preset sample is perpendicular to the second direction, measure the preset sample, and output a plurality of fourth voltage signals by the plurality of thickness detection chips corresponding to the first preset conductor; acquire a first average value AL and a second average value BL, where the first average value AL is an average value of the plurality of third voltage signals, and the second average value BL is an average value of the plurality of fourth voltage signals; apply a second preliminary voltage to the third conductor, where the second preliminary voltage is greater than the first detection voltage; control the detection device to perform dummy scan, and output a plurality of fifth voltage signals by a plurality of thickness detection chips corresponding to the third conductor; place the preset sample in the gap between the common unit and the detection unit, control the preset sample to move, where the moving direction of the preset sample is perpendicular to the second direction, and output a plurality of sixth voltage signals by the plurality of thickness detection chips corresponding to the second preset conductor; acquire a third average value AX and a fourth average value BX, where the third average value AX is an average value of the plurality of fifth voltage signals, and the fourth average value BX is an average value of the plurality of sixth voltage signals; and adjust the second preliminary voltage until a second difference value is equal to a first difference value, that is, BL−AL=BX−AX, where under the condition that the second preliminary voltage is the second detection voltage, the first difference value is a difference value between the first average value and the second average value, and the second difference value is a difference value between the third average value and the fourth average value.

Embodiment 7

Different from Embodiment 5, as shown in FIG. 8, an annular sleeve 25 is a non-conductive sleeve, a distance between each position of the third conductor 24 which is close to one exposed side surface of the detection unit 10 and the detection unit 10 is a first distance, a distance between each position of the annular sleeve 25 which is close to a surface of the detection unit 10 and the detection unit 10 is a second distance, the first distance is 0.4 mm, the second distance is 0.1 mm, the third conductor 24 is a metal round bar with a diameter of 16 mm, and the annular sleeve 25 is an annular non-conductive rubber stick with an inner diameter of 16 mm, an outer diameter of 16.3 mm and a length of 2 mm.

Another aspect of embodiments of the disclosure further provides a storage medium. The storage medium includes a stored program. Optionally, in this embodiment, the storage medium is configured to store a program code for executing the following steps:

S101, apply a detection voltage to a common unit;

S102, place an object to be measured in a gap between the common unit and a detection unit, control the object to be detected to move, wherein a moving direction of the object to be detected is perpendicular to a second direction, and obtain a plurality of first voltage signals;

S103, acquire a plurality of correction parameters, wherein the correction parameters are in one-to-one correspondence with the first voltage signals;

S104, correct the corresponding first voltage signals according to the correction parameters to obtain a plurality of corrected voltage signals; and S105, calculate a thickness of the object to be measured according to the corrected voltage signals.

Another aspect of the embodiment of the disclosure further provides a processor. The processor is configured to operate a program, wherein when being run, the program may execute a program code of the following steps in a scheduling method of an application program:

S101, apply a detection voltage to a common unit;

S102, place an object to be measured in a gap between the common unit and a detection unit, control the object to be detected to move, wherein a moving direction of the object to be detected is perpendicular to a second direction, and obtain a plurality of first voltage signals;

S103, acquire a plurality of correction parameters, wherein the correction parameters are in one-to-one correspondence with the first voltage signals;

S104, correct the corresponding first voltage signals according to the correction parameters to obtain a plurality of corrected voltage signals; and S105, calculate a thickness of the object to be measured according to the corrected voltage signals.

The serial number of the embodiment of the disclosure is only used for description and does not represent the merits of the embodiments.

In the above embodiments of the disclosure, the descriptions of various embodiments are emphasized on their respective aspects, and for portions of a certain embodiment that are not described in detail, reference may be made to the associated descriptions of other embodiments.

In several embodiments provided in the disclosure, it should be understood that the disclosed technology may be implemented in other ways. The apparatus embodiments described above are merely illustrative, for example, a division of the units may be a division of logical functions, and in practice there may be additional ways of division, for example, a plurality of units or assemblies may be combined or integrated into another system, or some features may be ignored or not performed. Moreover, shown or discussed coupling or direct coupling or communication connection between each other may be an indirect coupling or communication connection by means of some interface, unit or module, and may be in an electrical or other form.

The units illustrated as separate components may be physically separate or not, and the components shown as units may be physical units or not, that is, may be located in one place, or may also be distributed over a plurality of units. Part or all of the units may be selected according to actual needs to achieve the objective of the solution of the embodiment.

In addition, each functional unit in each embodiment of the disclosure may be integrated in one processing unit, or each unit may exist separately and physically, or two or more units may be integrated in one unit. The above integrated units may be implemented in a hardware form and may also be implemented in a form of software functional unit.

The integrated unit may be stored in a computer readable storage medium if implemented in the form of a software functional unit and sold or used as an independent product. Based on the understanding, the technical solution of the disclosure may be embodied in the form of a software product in essence or a part contributing to the prior art or all or part of the technical solution, and the computer software product is stored in a storage medium and comprises a plurality of instructions for making a computer device (which may be a personal computer, a server or a network device, etc.) perform all or part of the steps of the methods described in the various embodiments of the disclosure. The foregoing storage medium includes: a USB flash disk, a read-only memory (ROM), a random access memory (RAM), a mobile hard disk, a magnetic disk, an optical disk and other media capable of storing program codes.

The foregoing is merely preferred embodiments of the disclosure, and it should be noted that several improvements and modifications may also be made by those of ordinary skill in the art without departing from the principles of the disclosure, which should also be considered as the scope of protection of the disclosure.

From the above description, it may be seen that the above embodiments of the disclosure achieve the following technical effects:

1) In the thickness detection device of the disclosure, distances between the at least two positions of a first surface of a common unit and a detection unit are different, resulting in different intervals between the at least two positions of the common unit and the detection unit, and thereby reducing possibility of a paper jam in the thickness detection device and improving practicability of the thickness detection device. The common unit of the thickness detection device is easily manufactured, requires low cost, and is applicable to continuous detection.

2) In the thickness detection method of the disclosure, firstly, an object to be detected is detected to obtain a plurality of first voltage signals, then a plurality of correction parameters are acquired, the corresponding first voltage signals are corrected according to the correction parameters to obtain a plurality of corrected voltage signals, and finally a thickness of the object to be measured is calculated according to the corrected voltage signals. On the premise that the possibility of the paper jam is small, the thickness detection method corrects the sensitivity of the thickness detection device, thereby improving the accuracy of thickness detection.

3) In the thickness detection system of the disclosure, distances between the at least two positions of a first surface of a common unit and a detection unit are different, resulting in different intervals between the at least two positions of the common unit and the detection unit, and thereby reducing possibility of a paper jam in the thickness detection device and improving practicability of the thickness detection device, and the thickness detection system is particularly suitable for occasions of continuous detection and can correct the sensitivity of the thickness detection device, so as to improve the accuracy of thickness detection.

The foregoing is merely the preferred embodiments of the disclosure and is not intended to limit the disclosure, and various changes and modifications may be made by those skilled in the art. Any modifications, equivalent substitutions, improvements, and the like within the spirit and principles of the disclosure are intended to be included within the scope of protection of the disclosure.

What is claimed is:

1. A thickness detection method using a detection device for detection, comprising:
    applying a detection voltage to a common unit;
    placing an object to be detected in a gap between the common unit and a detection unit, controlling the object to be detected to move, wherein a moving direction of the object to be detected is perpendicular to a second direction, and obtaining a plurality of first voltage signals;
    acquiring a plurality of correction parameters, wherein the correction parameters are in one-to-one correspondence with the first voltage signals;
    correcting the corresponding first voltage signals according to the correction parameters to obtain a plurality of corrected voltage signals; and
    calculating a thickness of the object to be detected according to the corrected voltage signals,
    wherein the detection device comprises:
    the detection unit, comprising a plurality of thickness detection chips, wherein the plurality of thickness detection chips are sequentially arranged at least in the second direction; and
    the common unit, arranged opposite and spaced from the detection unit in a first direction, wherein distances between at least two positions of a first surface of the common unit and the detection unit are different, the second direction is perpendicular to the first direction and the moving direction of the object to be detected, and the first surface is a surface of the common unit which is close to the detection unit.

2. The thickness detection method according to claim 1, wherein the correction parameters comprise a first correction parameter, and a process for acquiring the first correction parameter comprises:
    applying the detection voltage to the common unit; and
    controlling the detection device to perform dummy scan to obtain a plurality of first correction parameters.

3. The thickness detection method according to claim 2, wherein the common unit comprises a first conductor and a second conductor insulated from each other, or the common unit comprises an annular sleeve and a third conductor insulated from each other, the annular sleeve is a conductive sleeve, the second electric conductor and the conductive sleeve are defined as a first preset conductor, the first conductor and the third conductor are defined as a second preset conductor, the detection voltages comprise a first detection voltage and a second detection voltage, and before applying the detection voltage to the common unit, the detection method further comprises:
    applying the first detection voltage to the first preset conductor;
    controlling the detection device to perform dummy scan, and outputting a plurality of third voltage signals by a plurality of thickness detection chips of the detection unit which is corresponding to the first preset conductor;
    placing a preset sample in the gap between the common unit and the detection unit, controlling the preset sample to move, wherein a moving direction of the preset sample is perpendicular to the second direction, detecting the preset sample, and outputting a plurality of fourth voltage signals by the plurality of thickness detection chips corresponding to the first preset conductor;
    acquiring a first average value and a second average value, wherein the first average value is an average value of the plurality of third voltage signals, and the second average value is an average value of the plurality of fourth voltage signals;
    applying a second preliminary voltage to the second preset conductor, wherein the second preliminary voltage is greater than the first measurement voltage;
    controlling the detection device to perform dummy scan, and outputting a plurality of fifth voltage signals by a plurality of thickness detection chips corresponding to the second preset conductor;
    placing the preset sample in the gap between the common unit and the detection unit, controlling the preset sample to move, wherein the moving direction of the preset sample is perpendicular to the second direction, and outputting a plurality of sixth voltage signals by the plurality of thickness detection chips corresponding to the second preset conductor;
    acquiring a third average value and a fourth average value, wherein the third average value is an average value of the plurality of fifth voltage signals, and the fourth average value is an average value of the plurality of sixth voltage signals; and
    adjusting the second preliminary voltage until a second difference value is equal to a first difference value, wherein under a condition that the second preliminary voltage is the second detection voltage, the first difference value is a difference value between the first average value and the second average value, and the second difference value is a difference value between the third average value and the fourth average value.

4. The thickness detection method according to claim 3, wherein applying the detection voltage to the common unit comprises:
    applying the first detection voltage to the first preset conductor; and
    applying the second detection voltage to the second preset conductor.

5. The thickness detection method according to claim 1, wherein the first surface comprises a first region and a second region, each position of the first region has a first distance from the detection unit, each position of the second region has a second distance from the detection unit, and the first distance is unequal to the second distance.

6. The thickness detection method according to claim 5, wherein there are a plurality of first regions and a plurality of second regions, and the first region and the second region are alternately arranged in the second direction, the first distance is greater than the second distance, and in any two adjacent regions which comprise the first region and the second region, a length of the first region in the second direction is less than a length of the second region in the second direction.

7. The thickness detection method according to claim 5, wherein the common unit comprises a first conductor, a side surface of the first conductor which is close to the detection unit is provided with a plurality of grooves, and the plurality of grooves are arranged at intervals in the second direction.

8. The thickness detection method according to claim 7, wherein the groove is an annular groove.

9. The thickness detection method according to claim 7, wherein the common unit further comprises a second conductor, the second conductor is arranged in the groove, an exposed surface of the first conductor which is close to the detection unit is the first region, and a surface of the second conductor which is close to the detection unit is the second region.

10. The thickness detection method according to claim 9, wherein a first insulation layer is arranged between the second conductor and the first conductor, and the first insulation layer insulates the first conductor from the second conductor.

11. The thickness detection method according to claim 7, wherein a second surface of the first conductor is provided with a plurality of protrusions, the protrusions and the grooves are arranged in a one-to-one correspondence manner in the first direction, and the second surface is a surface of the first conductor which is away from the detection unit.

12. The thickness detection method according to claim 5, wherein the common unit comprises a third conductor and a plurality of annular sleeves, the plurality of annular sleeves sleeve the third conductor at intervals in the second direction.

13. The thickness detection method according to claim 12, wherein the annular sleeve is a conductive sleeve.

14. The thickness detection method according to claim 13, wherein a second insulation layer is arranged between the conductive sleeve and the third conductor, and the second insulation layer insulates the third conductor from the conductive sleeve.

15. The thickness detection method according to claim 12, wherein the annular sleeve is a non-conductive sleeve.

16. The thickness detection method according to claim 7, wherein the first conductor is a first cylinder, and the first cylinder has an axis parallel to the second direction.

17. The thickness detection method according to claim 12, wherein the third conductor is a second cylinder, and the second cylinder has an axis parallel to the second direction.

* * * * *